(12) United States Patent
Loew et al.

(10) Patent No.: US 8,771,090 B2
(45) Date of Patent: Jul. 8, 2014

(54) DEVICE FOR TRANSMITTING TORQUES FOR A DRIVE TRAIN OF A MOTOR VEHICLE

(75) Inventors: Johann Loew, Garching (DE); Franz Kobus, Jettenbach (DE)

(73) Assignee: SGF Sueddeutsche Gelenkscheibenfabrik GmbH & Co. KG, Waldkraiburg (DE)

( * ) Notice: Subject to any disclaimer, the term of this patent is extended or adjusted under 35 U.S.C. 154(b) by 0 days.

(21) Appl. No.: 13/810,237

(22) PCT Filed: Jul. 15, 2011

(86) PCT No.: PCT/EP2011/003550
§ 371 (c)(1),
(2), (4) Date: Mar. 5, 2013

(87) PCT Pub. No.: WO2012/007177
PCT Pub. Date: Jan. 19, 2012

(65) Prior Publication Data
US 2013/0210532 A1      Aug. 15, 2013

(30) Foreign Application Priority Data
Jul. 15, 2010  (DE) .................... 10 2010 027 210

(51) Int. Cl.
*F16D 3/76*       (2006.01)
(52) U.S. Cl.
USPC .......................................................... 464/93
(58) Field of Classification Search
USPC .......................... 464/69, 87, 92–96
See application file for complete search history.

(56) References Cited

FOREIGN PATENT DOCUMENTS

| DE | 32 45 041 | A1 |   | 6/1984 |
|----|-----------|----|---|--------|
| DE | 3245041   |    | * | 6/1984 |
| DE | 195 31 201| A1 |   | 2/1997 |
| DE | 19531201  |    | * | 2/1997 |
| DE | 101 16 897| A1 |   | 10/2002 |
| EP | 1 099 945 | A2 |   | 5/2001 |

OTHER PUBLICATIONS

International Search Report for corresponding application No. PCT/EP2011/003550 mailed Sep. 14, 2011.

* cited by examiner

*Primary Examiner* — Gregory Binda
*Assistant Examiner* — Josh Skroupa
(74) *Attorney, Agent, or Firm* — Carter, Deluca, Farrell & Schmidt

(57) ABSTRACT

A device for transmitting torques for a drive train includes a torsional vibration absorber with a primary mass rotatable about an axis of rotation, a secondary mass rotatable about the axis of rotation relative to the primary mass and an elastomer body arranged between the primary mass and secondary mass, and an articulated body having a plurality of bushings arranged in the circumferential direction at predetermined angular intervals with respect to the axis of rotation. The articulated body is connected in a torque-transmitting manner to the primary mass via a first group of bushings and, for the torque-transmitting coupling, is coupled to part of the drive train via a second group of bushings. Intermediate bushings for connection of the articulated body to the primary mass, are attached at one end and connected at the other end to individual bushings of the first group of bushings.

9 Claims, 3 Drawing Sheets

Figure 4:
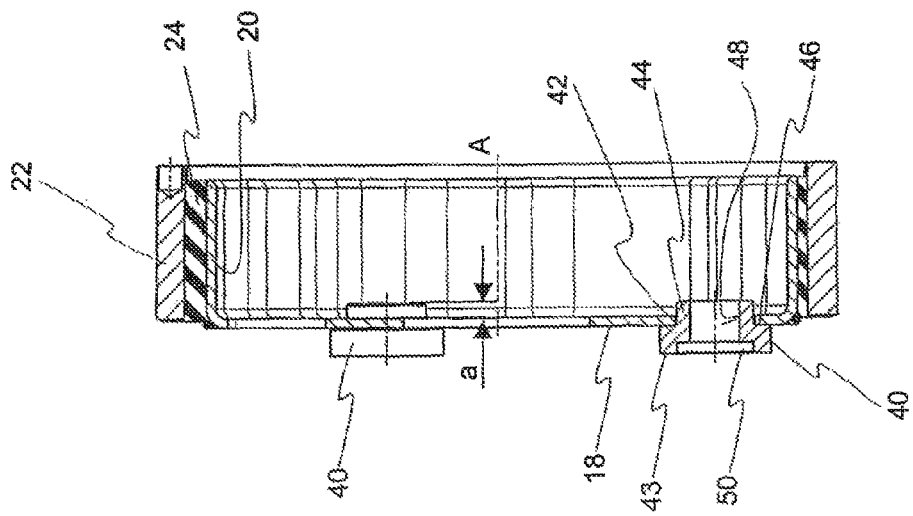

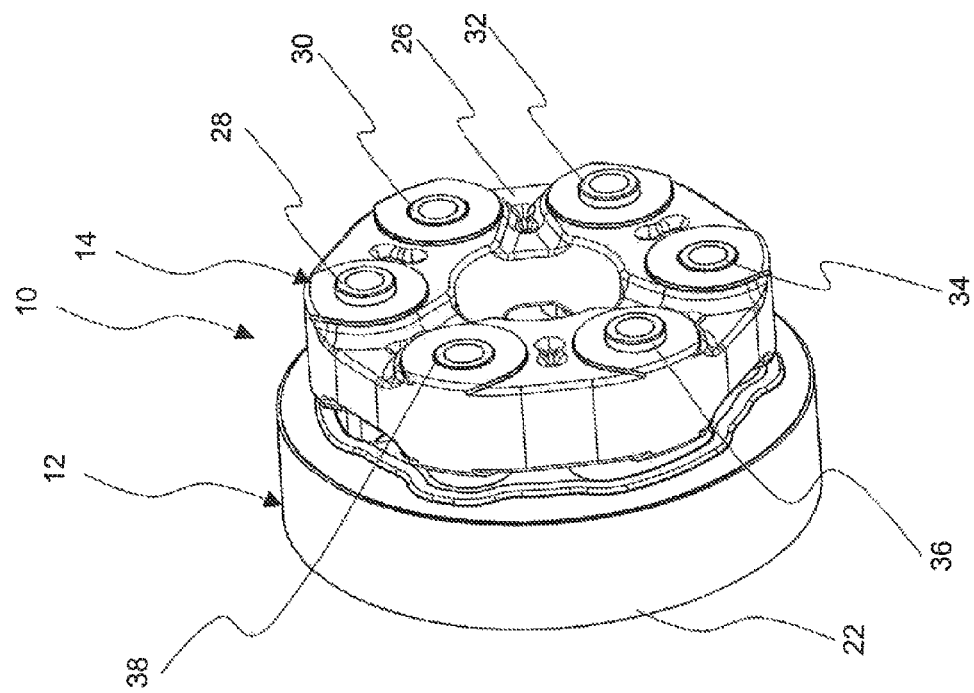
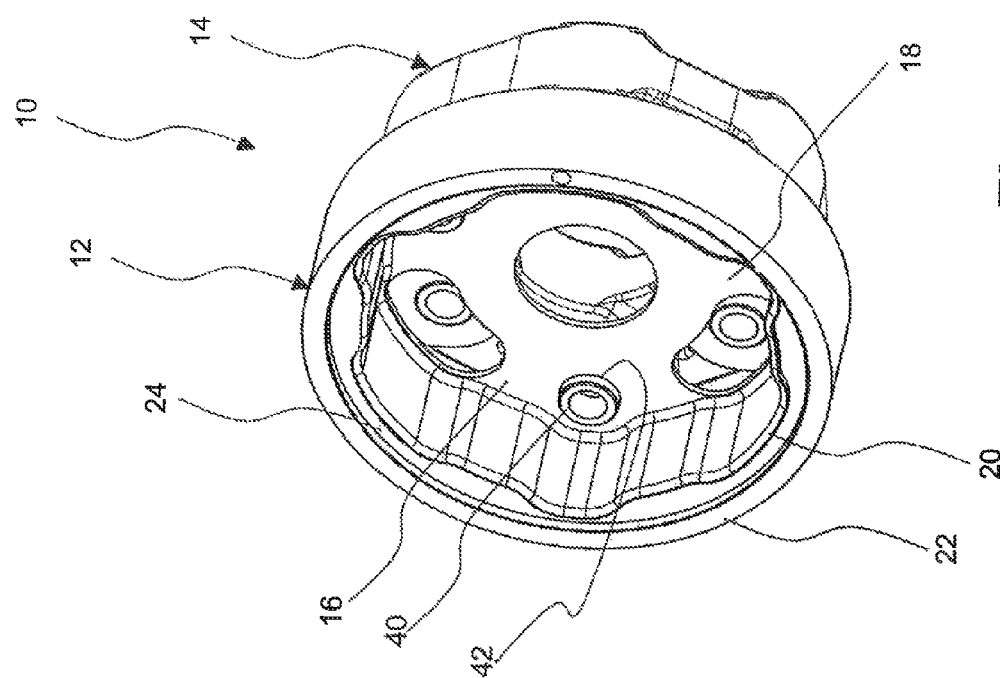
Fig. 1
Fig. 2

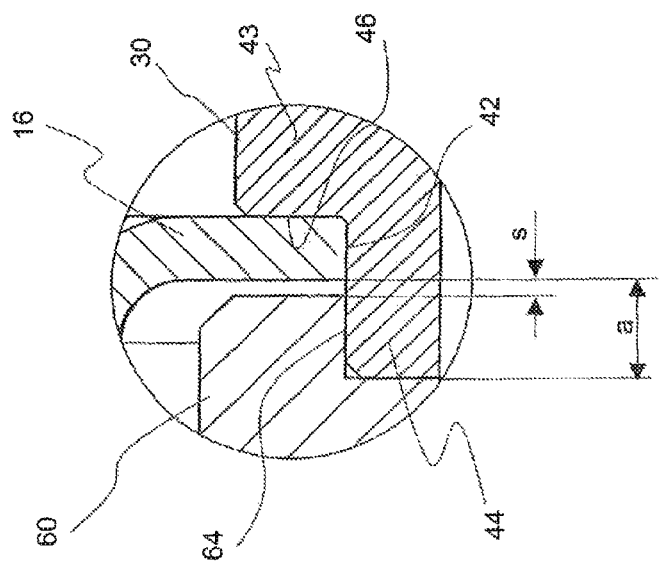
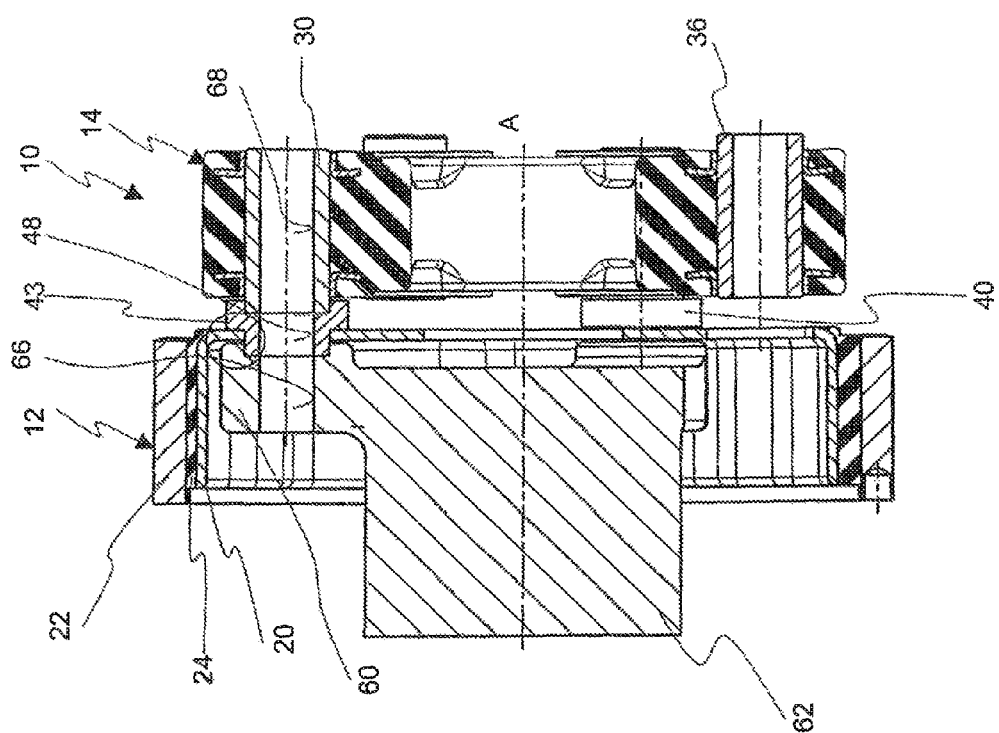
Fig. 6
Fig. 5

DEVICE FOR TRANSMITTING TORQUES FOR A DRIVE TRAIN OF A MOTOR VEHICLE

The present invention relates to a device for transmitting torques for a drive train of a motor vehicle.

From the background art it is known to provide a torsional vibration absorber, which is in particular tuned to specific frequencies, in the drive train of a motor vehicle in order to reduce torsional vibrations. It is further known from the background art to provide in the drive train to of a motor vehicle an articulated body, for example a so-called flexible disk, which due to its elastic deformability exhibits a certain compensating function in the event of axial offset or angularity of two shaft portions that are to be connected to one another. In view of the trend towards a more compact design of components in automobile manufacture there is a demand to combine different functional components in a unit, in order i.a. to save installation space. This applies equally to the area of the drive train.

An object of the present invention is therefore to provide a device for transmitting torques for a drive train of a motor vehicle that combines a compact installed shape with a power flow that is advantageous in terms of the torque to be transmitted and wear and has a long service life.

This object is achieved by a device for transmitting torques for a drive train of a motor vehicle, comprising:
- a torsional vibration absorber with a primary mass which is rotatable about an axis of rotation, a secondary mass which is rotatable about the axis of rotation relative to the primary mass and an elastomer body which is arranged between the primary mass and secondary mass, and
- an articulated body having a plurality of bushings which are arranged in the circumferential direction at predetermined angular intervals with respect to the axis of rotation of the articulated body, wherein the articulated body is connected in a torque-transmitting manner to the primary mass of the torsional vibration absorber via a first group of bushings, and wherein the articulated body is configured for the torque-transmitting coupling via a group of bushings to one part of the drive train and the torsional vibration absorber is configured for the torque-transmitting to coupling to another part of the drive train. In this case, according to the invention it is provided that intermediate bushings are provided for the connection of the articulated body to the primary mass of the torsional vibration absorber, said intermediate bushings being attached at one end to the primary mass and each being connected at the other end to individual bushings of the first group of bushings of the articulated body.

Through the use of intermediate bushings that are attached in a predetermined manner to the primary mass it is possible to transmit the power flow from the flexible disk via the intermediate bushings directly to a connection part without using the primary mass directly for this purpose. This has the advantage that the primary mass need perform exclusively its function as a coupling element to the secondary mass but no further functions. In particular this makes it possible to achieve a relatively simple design for the primary mass and avoid complex geometries or bulky material accumulations. This makes the overall arrangement easier to manufacture and better able to meet the application-related demand for lightweight components.

According to a form of construction of the invention it is provided that the intermediate bushings are connected in a fixed manner, in particular by welding, riveting, screwing or moulding, to the primary mass of the torsional vibration absorber. Although the intermediate bushings are connected in a fixed manner to the primary mass of the torsional vibration absorber, the power flow occurs through the intermediate bushings and not via the primary mass. The intermediate bushings additionally serve to transmit the action of the torsional vibration absorber to the drive train.

It is preferably provided that the primary mass of the torsional vibration absorber is provided with location holes, in which the intermediate bushings are received. The intermediate bushings may however alternatively be attached to one side of the primary mass of the torsional vibration absorber.

With regard to the design of the intermediate bushings, according to the invention it is possible that these each comprise a larger-diameter axial portion and a smaller-diameter axial portion, between which a seating shoulder is provided, wherein the smaller-diameter axial portion is received in a location hole of the torsional vibration absorber in such a way that the seating shoulder is seated at the one side of the primary mass around the respective location hole and that the smaller-diameter axial portion projects axially from the other side of the primary mass. The seating shoulder defines a preset axial position of the individual intermediate bushings, so that these may be fastened in this predetermined position to the primary mass. The fact that the smaller-diameter axial portion projects from the primary mass facilitates an attachment to a part of the drive train.

In this connection, according to a form of construction of the invention it is possible that a fastening flange of the drive train is attachable to the smaller-diameter axial portion projecting axially from the primary mass, wherein in the fastening situation an axial clearance is provided between fastening flange and primary mass. The axial clearance for example prevents the primary mass from getting crushed and damaged during the fastening of the fastening flange to the intermediate bushings. This ensures that an integration into the power flow of the torque transmission may be reliably ruled out.

With regard to the fastening of the intermediate bushings to the articulated body, according to the invention it may be provided that the larger-diameter axial portion of the intermediate bushings has a location recess, in which bushings of the first group of bushings of the articulated body are received. In this case, according to a constructional variant of the invention it is possible that the bushings of the first group of bushings are press-fitted in each case into the location recess of an intermediate bushing. Other types of fastening are however also conceivable. For example, in a form of construction of the invention it may be provided that the intermediate bushings as well as the bushings of the first group of bushings have throughholes for receiving fastening bolts. The fastening bolts may be used to brace the fastening flange of a part of the drive train with the intermediate bushings and the articulated body into a unit.

With regard to the design of the primary mass of the torsional vibration absorber, according to a constructional variant of the invention it is possible that the primary mass comprises a sheet-metal part. The sheet-metal part may be for example a sheet-metal part that is deep-drawn or formed in some other way. For example, it is possible for the primary mass of the torsional vibration absorber to be of a pot-like configuration, wherein the inside diameter of the pot interior is dimensioned in such a way that a fastening flange of the drive train may be received therein, in particular with clearance. This variant of the invention equally serves to make the device according to the invention more compact in axial direction.

With regard to the design of the torsional vibration absorber, according to the invention it may be provided that its secondary mass is arranged on the outer circumference of the primary mass above the elastomer body.

Figure 3:
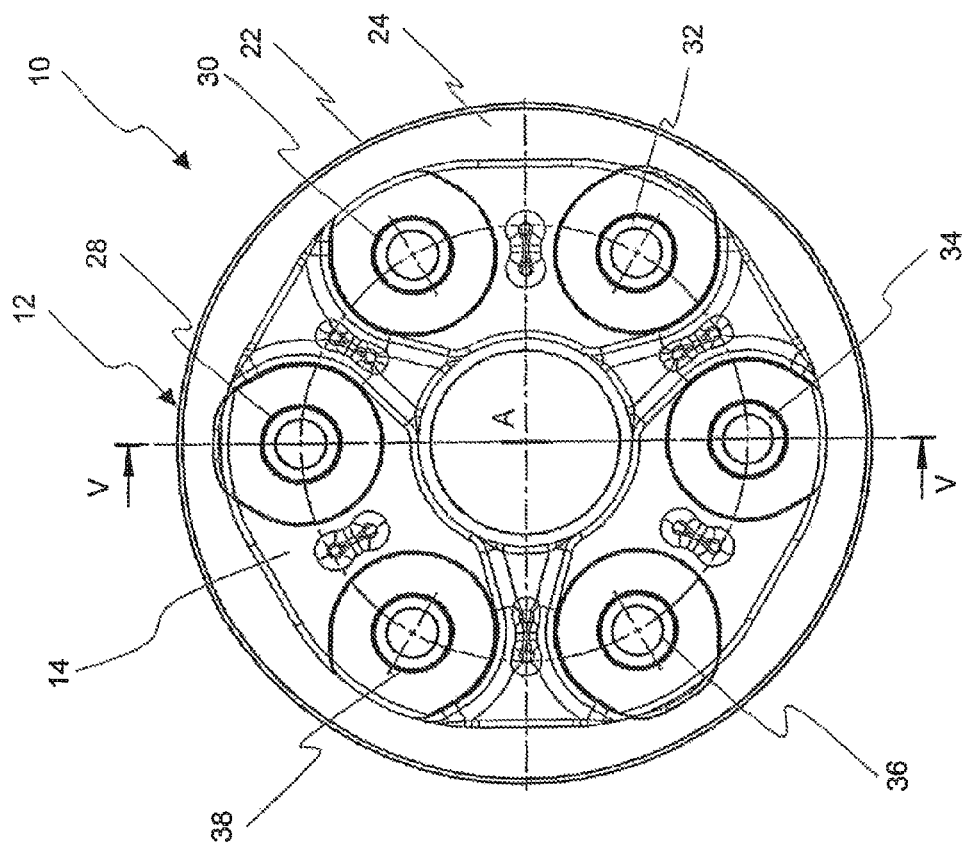

The invention is described below by way of example with reference to the accompanying figures. These show:

FIG. 1 a perspective view of the device according to the invention;

FIG. 2 a further perspective view of the device according to the invention;

FIG. 3 a front view of the device according to the invention;

FIG. 4 an axis-containing sectional view of the torsional vibration absorber of the device according to the invention;

FIG. 5 an axis-containing sectional view of the device according to the invention in accordance with the cutting line V-V of FIG. 3; and FIG. 6 an enlargement of the diagram detail VI of FIG. 5.

In FIGS. 1 and 2 a device according to the invention is shown in different perspective views and generally denoted by 10. It comprises a torsional vibration absorber 12 and an articulated body in the form of a flexible disk 14.

The torsional vibration absorber 12 comprises a pot-like primary mass 16, which is configured with a perforated base plate 18 and a corrugated, radially outer edge 20. The primary mass 16 is manufactured in the form of a sheet-metal part that is deep-drawn, formed or wrought in some other way. The radially outer edge 20 is surrounded by a hollow-cylindrical secondary mass 22. Vulcanized in between the radially outer edge 20 and the inner circumferential surface of the secondary mass 22 is an elastomer rubber layer 24, which acts as a spring element to enable the secondary mass 22 to rotate to a specific extent relative to the primary mass 16. The rubber layer 24 may be locally interrupted, i.e. have defined rubber webs. It may also further include guide elements, such as for example sliding blocks, thereby guaranteeing a defined relative rotation between primary mass 16 and secondary mass 22 that provides a torsional vibration damping effect.

The flexible disk 14 comprises an elastomer disk body 26, in which cylindrical bushings 28, 30, 32, 34, 36, 38 are embedded. The bushings 30, 34, 38 form a first group of bushings that is used for the connection to the torsional vibration absorber 12. The bushings 28, 32, 36 form a second group of bushings, by means of which the device 10 according to the invention may be coupled at the side of the flexible disk 14 in an, as such, known torque-transmitting manner, for example via a suitable three-armed flange, to the drive train (not shown). For this purpose the bushings 28, 32, 36 of the second group of bushings project axially from the flexible disk 14.

It is further evident from FIG. 1 that in the perforated base plate 18 intermediate bushings 40 (of which only one is shown) are mounted in alignment with the bushings 30, 34, 38 of the first group of bushings. These intermediate bushings 40 are received in a substantially positive manner, i.e. without clearance, in corresponding location holes 42 and connected in a fixed manner, in the illustrated embodiment by welding, to the base plate 18 of the primary mass 16.

The arrangement of the intermediate bushings 40 is shown in detail in FIG. 4 in the sectional view through the torsional vibration absorber 12 that contains the axis of rotation A. The intermediate bushing 40 comprises a larger-diameter axial portion 43 and a smaller-diameter axial portion 44, which are linked to one another by a shoulder 46. The intermediate bushing 40 further comprises a through-hole 48 that widens at the, in FIG. 4, left side into a location recess 50. The intermediate bushing 40 rests with the shoulder 46 against the, in FIG. 4, left surface of the base plate 18 around the location hole 42. The larger-diameter axial portion 43 therefore projects with its entire axial length from the base plate 18. The smaller-diameter axial portion 44 extends through the location hole 42 and projects axially by the dimension a from the, in FIG. 4, right side of the base plate 18.

A total of three intermediate bushings 40 are attached to the base plate 18 at uniform angular intervals of 120° around the axis of rotation A.

In FIG. 5 the device 10 according to the invention is shown in cross section, wherein a fastening flange 60 of a shaft portion 62 is disposed with radial clearance in the interior of the primary mass 16 of the torsional vibration absorber 12. With regard to the enlarged diagram detail according to FIG. 6 it is evident that the flexible disk 14 is inserted by the axially projecting portion of the bushings of its first group of bushings (of which only bushing 28 is shown) in each case into the location recess 50 of the larger-diameter axial portion 43 of the intermediate bushing 40. The smaller-diameter axial portion 44 extends through the location hole 42. A part of the axial portion 44, which projects by the dimension a, is received in a corresponding location recess 64 in the fastening flange 60. The fastening flange 60 is however held with a defined axial clearance s from the opposite side of the base plate 18.

Through the axially aligned holes of substantially equal diameter of the individual components, namely through a hole 68 in the bushing 28, the hole 48 in the intermediate bushing 40 and a hole 66 in the fastening flange 60, a non-illustrated fastening cap bolt may be inserted and screw-fastened in order in this way to connect the fastening flange 60 in a torque-transmitting manner to the device according to the invention. In an, as such, known manner a further fastening flange (not shown) is screw-fastened via the second group of bushings, i.e. via the bushings 28, 32, 36 by means of connecting bolts to the flexible disk 14.

For the torque transmission the power flow passes through the device according to the invention via the intermediate bushings 40 and the bushings 30, 34, 38—connected in a fixed manner thereto—of the first group of bushings of the flexible disk 14 through the flexible disk 14 and the bushings 28, 32, 36 of the second group of bushings thereof. The primary mass 16 is entirely excluded from this power flow for torque transmission and serves merely as a connecting element between the drive train and the secondary mass 22. By virtue of this design according to the invention it is possible for the primary mass 16 to be configured relatively simply and economically as a sheet-metal part without any need to take the power flow for torque transmission into consideration.

The invention claimed is:

1. A device for transmitting torques for a drive train of a motor vehicle, comprising:

a torsional vibration absorber with a primary mass which is rotatable about an axis of rotation, the primary mass including location holes;

a secondary mass which is rotatable about the axis of rotation relative to the primary mass and an elastomer body which is arranged between the primary mass and secondary mass;

an articulated body having a plurality of bushings which are arranged in a circumferential direction at predetermined angular intervals with respect to the axis of rotation of the articulated body, the articulated body being connected in a torque-transmitting manner to the primary mass of the torsional vibration absorber via a first group of bushings and configured for a torque-transmitting coupling via a second group of bushings to one part of the drive train, the torsional vibration absorber being configured for the torque-transmitting coupling to another part of the drive train; and intermediate bushings for the connection of the articulated body to the primary mass of the torsional vibration absorber, the intermediate bushings being attached at one end to the primary mass and each being connected at a second end to individual bushings of the first group of bushings of the articulated body, wherein the intermediate bushings each comprise a larger-diameter axial portion and a smaller-diameter axial portion, between which a seating shoulder is provided, wherein the smaller-diameter axial portion is received in a location hole of the torsional vibration absorber in such a way that the seating shoulder is seated at one side of the primary mass around the respective location hole and that the smaller-diameter axial portion projects axially from another side of the primary mass, wherein the intermediate bushings are connected in a fixed manner to the primary mass of the torsional vibration absorber, and wherein a fastening flange of the drive train is attachable to the smaller-diameter axial portion projecting axially from the primary mass, wherein the torsional vibration absorber includes a base plate, and the fastening flange is held with a defined axial clearance from the base plate.

2. The device according to claim 1, wherein the intermediate bushings are fixedly connected to the primary mass by a method selected from the group consisting of welding, riveting, press-fitting, caulking, and gluing.

3. The device according to claim 1, wherein the larger-diameter axial portion of the intermediate bushings has in each case a location recess, in which a respective bushing of the first group of bushings of the articulated body is received.

4. The device according to claim 3, wherein the bushings of the first group of bushings are press-fitted in each case into the location recess of one of the intermediate bushings.

5. The device according to claim 1, wherein the intermediate bushings and the bushings of the first group of bushings includes through-holes for receiving fastening bolts.

6. The device according to claim 1, wherein the primary mass of the torsional vibration absorber comprises a sheet-metal part.

7. The device according to claim 1, wherein the primary mass of the torsional vibration absorber is of a pot-like configuration, wherein an inside diameter of the pot interior is dimensioned such that the fastening flange of the drive train may be received therein.

8. The device according to claim 7, wherein the secondary mass of the torsional vibration absorber is arranged on an outer circumference of the primary mass above the elastomer body.

9. A device for transmitting torques for a drive train of a motor vehicle, comprising:

a torsional vibration absorber including a primary mass which is rotatable about an axis of rotation, the primary mass including location holes;

a secondary mass which is rotatable about the axis of rotation relative to the primary mass and an elastomer body which is arranged between the primary mass and secondary mass;

an articulated body having a plurality of bushings which are arranged in a circumferential direction at predetermined angular intervals with respect to the axis of rotation of the articulated body, the articulated body being connected in a torque-transmitting manner to the primary mass of the torsional vibration absorber via a first group of bushings and is configured for a torque-transmitting coupling via a second group of bushings to one part of the drive train, the torsional vibration absorber being configured for the torque-transmitting coupling to another part of the drive train; and intermediate bushings for the connection of the articulated body to the primary mass of the torsional vibration absorber, the intermediate bushings being attached at one end to the primary mass and each being connected at a second end to individual bushings of the first group of bushings of the articulated body, wherein the intermediate bushings are connected in a fixed manner to the primary mass of the torsional vibration absorber, and the intermediate bushings project axially from the primary mass such that a fastening flange of the drive train is attachable, wherein the torsional vibration absorber includes a base plate, and the fastening flange is held with a defined axial clearance from the base plate.

* * * * *